UNITED STATES PATENT OFFICE.

ROBERT HOCHSTETTER, OF CINCINNATI, OHIO.

INK AND PROCESS OF MAKING SAME.

1,158,131.     Specification of Letters Patent.     Patented Oct. 26, 1915.

No Drawing.     Application filed September 28, 1912. Serial No. 722,830.

*To all whom it may concern:*

Be it known that I, ROBERT HOCHSTETTER, a citizen of the United States, and a resident of Cincinnati, in the county of Hamilton and State of Ohio, have invented certain new and useful Improvements in Ink and Processes of Making Same; and I do hereby declare that the following is a full, clear, and exact description thereof.

This invention relates to a novel ink and process for producing same.

My new ink is designed particularly for use on an oscillating or rotary mimeograph, or like machine, and particularly when such a machine is provided with a gelatin-coated stencil instead of a wax stencil, although my new ink may be used with wax stencils on short runs where a limited number of copies are printed.

An ink made in accordance with my Patents Nos. 928,915 and 928,450, granted to me on the 20th day of July, 1909, may be used upon a gelatin stencil, but as such an ink contains glycerin in large quantities the gelatin will gradually be dissolved and the letters of the stencil will become larger and larger, making the work ragged and heavy. On standing also the prior inks referred to will dissolve the entire gelatin in time. Another disadvantage of my prior patented ink is that when exposed to the atmosphere it will absorb moisture in damp weather and become thin in body and tinctorially weak, so that the resulting print will be weak and the ink will work poorly on the machine. Furthermore, the moisture absorbed by the ink will tend to corrode the metal parts of the mimeograph machine and are likewise objectionable on that account.

The object of the present invention is to provide an ink and a process for producing the same which will be free of the disadvantages above referred to and will also be capable of use on a gelatin coated stencil without harm to the stencil.

To produce my improved ink I proceed as follows: I select a pigment of the desired color made on a base such that when the pigment is ground in a varnish or an oil, but a small or minimum amount of varnish or oil will be held by the pigment when printed on paper, the base being such that it will shed the varnish. Such a pigment, when made up into ink, will remain on the surface of the paper but for a short time and will have a tendency to be absorbed by the paper or to penetrate into the paper, the varnish having a tendency to penetrate the paper and drawing the pigment after it, thus incorporating the pigment in the fiber of the paper. Such pigments do not contain aluminum hydrate, magnesium carbonate, or like substances, that tend to hold large amounts of varnish, and when forming the base of a pigment used in making an ink, tend to remain for a long time on the surface of the paper to which the ink is applied.

I grind the pigment of the kind referred to in a varnish, as, for example, a linseed oil, or other vegetable oil, bodied by heat, to give it tack or stickiness and cohesion. I then add an oil or oil mixture which will cause the pigment and varnish to penetrate without spreading on paper,—that is to say, an oil that will cause the mixture to sink into the paper without spreading laterally on the surface of the paper. Such an oil may be made by mixing a non-drying mineral oil with a drying vegetable oil. This finishes the process and produces the ink. The addition of Turkey red or other sulfonated oil in small amounts is also of advantage in that it increases the rapidity with which the resulting ink sets or draws into the paper and also prevents spreading in the paper.

To illustrate by a specific example, how to make my improved ink, I proceed as follows: I take the following parts, by weight,—125 parts of linseed oil #000, 25 parts of peerless black, 5 parts of Milori blue, and 6 parts of magnesium carbonate. These are ground together and I then add 25 parts #400 oil, that is to say, mineral oil of 18° Bé., 25 parts of peanut oil, 260 parts of linseed oil, #000, and then to the whole I add 2 parts of citronella oil, which is for the purpose of giving a pleasant odor to the ink. The linseed oil is bodied by heating so as to have the proper tack and cohesion, as indicated by #000. The peerless black and the Milori blue are both made on bases which will only hold minimum amounts of varnish. The #400 oil is a mineral oil, which causes the mixture to penetrate, while the peanut oil is a vegetable oil which prevents the mixture from spreading on the paper.

As another example of how to make my improved ink, I proceed as follows: I take the following parts, by weight, 165 parts of purple pigment made on a barium sulfate (BaSO₄) base, 150 parts linseed varnish. After grinding, add 37½ parts of mineral oil 18° Bé., 37½ parts peanut oil, 150 parts linseed varnish, 4 parts Turkey red oil, 2 parts oil of citronella.

My improved ink fulfils all the requirements of a mimeograph ink in that it draws evenly through the stencil and prints with a sharp outline, dries quickly when printed on hard paper, and will not smudge or offset when sheets are placed on top of one another, remains liquid on the pad for long periods of time, and at the same time does not show undue separation when standing in bulk. In addition, my improved ink is not affected by moisture and does not absorb water and therefore does not corrode the cylinder or metal parts of the mimeograph with which it is used. Also, it has the essential quality of not affecting the gelatin of the stencil, where a gelatin-coated stencil is used.

While in describing the process of forming my improved ink I have described a certain order in which the steps of the process are preferably carried out, it is to be understood that this order is not material either as referred to in the description or in the claims, but simply that in which it may be performed most readily.

I claim as my invention—

1. The process of producing an ink for oscillating or rotary mimeographs, and the like, consisting in grinding in a varnish a pigment made on a base that will hold but a minimum amount of varnish, and adding an oil or oil mixture which is adapted to cause the mixture to penetrate the paper without undue spreading.

2. The process of producing an ink for oscillating or rotary mimeographs, and the like, which consists in grinding a pigment made on a base which will hold but a minimum amount of varnish or oil, in a vegetable oil bodied by heating and mixing therewith a mixture of a mineral oil and of a vegetable oil to make the ink penetrate and to prevent undue spreading of the ink in the paper.

3. The process of producing an ink for oscillating or rotary mimeographs, and the like, which consists in grinding in a varnish a pigment made on a base which when ground in an oil or varnish will hold but a minimum amount of varnish, mixing therewith an oil which will cause the mixture to penetrate paper without undue spreading, and adding thereto a small amount of Turkey red or other sulfonated oil.

4. The process of producing an ink for oscillating or rotary mimeographs, and the like, which consists in grinding in a varnish a pigment made on a base which when ground in an oil or varnish will hold but a minimum amount of varnish, mixing therewith an oil which will cause the mixture to penetrate paper without undue spreading, and adding thereto a small amount of magnesium carbonate, or like fluffy substance which holds large quantities of varnish, and a small amount of Turkey red oil or other sulfonated oil.

5. The process of producing an ink for oscillating or rotary mimeographs, and the like, which consists in grinding a pigment in an oil or oil mixture, the pigment and oil when combined having the required cohesion and tack, and the oil or oil mixture being capable of causing the mixture to penetrate paper without undue spreading.

6. An ink, for use with oscillating or rotary mimeographs, and the like, consisting of a pigment and oil, the ink having the necessary tack to draw it rapidly through the stencil, having quick penetrative properties to rapidly draw or set the ink into the paper so that it will dry by absorption without oxidation, even on bond paper, in a comparatively short time, having the necessary cohesion to prevent it from spreading laterally on the paper, being non-hydroscopic and being quick drying.

7. An ink for oscillating or rotary mimeographs, or the like, consisting of a pigment having a base that will hold but a minimum amount of varnish, of varnish, and having mixed with it an oil or oil mixture which is adapted to cause the mixture to penetrate paper without lateral spreading.

8. An ink for oscillating or rotary mimeographs, or the like, consisting of a pigment having a base that will hold but a minimum amount of varnish or oil, of vegetable oil, and of a mixture of a mineral oil and of a vegetable oil adapted to make the ink penetrate paper and to prevent undue spreading of the ink on the paper.

9. An ink for oscillating or rotary mimeographs, and the like, consisting of a pigment having a base which will hold but a minimum amount of varnish, of varnish, and having mixed with it an oil which will cause the mixture to penetrate paper without undue spreading, and containing a small amount of Turkey red or other sulfonated oil.

In testimony, that I claim the foregoing as my invention I affix my signature in the presence of two witnesses, this 25th day of September A. D. 1912.

ROBERT HOCHSTETTER.

Witnesses:
JAMES HAMILTON,
WM. P. GEGER.